United States Patent [19]

Sakamoto et al.

[11] Patent Number: 5,418,263
[45] Date of Patent: May 23, 1995

[54] EPOXY RESIN-BASED CATHODIC ELECTRODEPOSITION PAINT CONTAINING HYDROPHOBIC MONOEPOXIDE-AMINE ADDUCTS

[75] Inventors: Toshiaki Sakamoto, Hirakata; Yoshio Kojima, Nara; Kenshiro Tobinaga, Hiroshima, all of Japan

[73] Assignee: Nippon Paint Co., Ltd., Osaka, Japan

[21] Appl. No.: 229,612

[22] Filed: Apr. 19, 1994

[30] Foreign Application Priority Data

Apr. 20, 1993 [JP] Japan .................................. 5-117969

[51] Int. Cl.$^6$ ................................................ C08K 3/20
[52] U.S. Cl. ..................................... 523/404; 523/415; 525/526
[58] Field of Search .............................. 523/404, 415

[56] References Cited

U.S. PATENT DOCUMENTS

| | | | |
|---|---|---|---|
| 3,947,339 | 3/1976 | Jerabek et al. | 524/901 |
| 4,089,826 | 5/1978 | Moss et al. | 523/404 |
| 5,246,984 | 9/1993 | Darwen et al. | 523/404 |

Primary Examiner—Frederick Krass
Attorney, Agent, or Firm—Millen, White, Zelano, & Branigan

[57] ABSTRACT

A cathodic electrodeposition paint containing as a binder resin an amine-epoxy resin adduct and a blocked polyisocyanate crosslinker is disclosed. The binder resin and the crosslinker are emulsified in an aqueous medium containing a neutralizing agent with the aid of amine adduct of a monoepoxide compound having a hydrophobic group or block. Not only the amine-monoepoxide adduct functions as a surfactant but also it is deposited electrically and then cured with the crosslinker integrally with the binder resin.

17 Claims, No Drawings

EPOXY RESIN-BASED CATHODIC ELECTRODEPOSITION PAINT CONTAINING HYDROPHOBIC MONOEPOXIDE-AMINE ADDUCTS

FIELD OF THE INVENTION

This invention relates to cathodic electrodeposition paints containing cationic modified epoxy resins and blocked polyisocyanate crosslinkers in the form of an emulsion.

BACKGROUND OF THE INVENTION

Cationic modified epoxy resins used in cathodic electrodeposition paint formulations are produced by reacting a starting epoxy resin with an amine to open the epoxy group with the amine in order to render the resin hydrophilic and cationically chargeable. The resulting amine-modified resin and a crosslinker such as blocked polyisocyanates are then emulsified in an aqueous medium containing a neutralizing agent for use in the electrodeposition coating process.

The amine-modified epoxy resins of this type per se are not easily emulsifiable in an aqueous medium and thus require a surfactant. It has been discovered that even when emulsified with the aid of conventional surfactants, the resin can only be emulsified into particles of relatively large particle sizes which tend to settle upon standing.

SUMMARY OF THE INVENTION

The present invention utilizes in lieu of or in addition to conventional surfactants a unique component to emulsify amine-modified epoxy resins for cathodic electrodeposition paints. This unique component is an amine adduct of a monoepoxide compound having a hydrophobic group or block. This component is capable of depositing electrically onto a metallic substrate and thus forms a film integrally with the binder resin while serving as a surfactant to emulsify the binder resin into fine particles.

Accordingly, the present invention provides a stable emulsion and a pigmented cathodic electrodeposition paint formed therefrom comprising:

(a) a cationic modified epoxy resin produced by the addition reaction of an epoxy resin having a plurality of epoxy groups in the molecule and a primary or secondary amine;

(b) 0.1 to 10 weight parts per 100 weight parts of said modified epoxy resin of an adduct of monoepoxide compound having a hydrophobic group or block and a primary or secondary amine; and (c) a blocked polyisocyanate compound;

said components (a), (b) and (c) being emulsified in an aqueous medium containing a neutralizing agent.

With the exception of the monoepoxide-amine adduct, the cathodic paint of the present invention may be otherwise identical to known epoxy-based cathodic paints.

The monoepoxide-amine adduct is produced by addition-reacting a monoepoxide having a hydrophobic group or block and a primary or secondary amine. Since the amine moiety of the adduct is hydrophilic in nature, the adduct meets the structural requirement for surfactants while, at the same time, being chargeable to the same polarity as the binder resin to be emulsified. Thus, not only the monoepoxideamine adduct may serve as a surfactant to emulsify the binder resin into fine particles, but also it may be deposited electrically into a film integrally with the binder resin and then cured with the blocked polyisocyanate crosslinker.

DETAILED DESCRIPTION OF THE INVENTION

Monoepoxide compounds usable as the starting material of the amine adduct preferably contain 13 or more total carbon atoms and have a molecular weight from 200 to 1,000. Examples thereof include glycydyl ethers of higher fatty alcohols having 10 or more carbon atoms such as lauryl glycidyl ether, myristyl glycidyl ether, cetyl glycidyl ether, stearyl glycidyl ether or oleyly glycidyl ether; glycidyl ethers of alkylphenol having 4 or more carbon atoms in the alkyl moiety such as glycidyl nonylphenyl ether; and polyoxypropylene monoalkyl monoglycidyl ethers such as polyoxypropylene monobutyl monoglycidyl ether.

Amine components may be the same primary or secondary amines used to prepare the binder resin from epoxy resins. Preferably these amines additionally have a hydroxyl group or ketiminized amino group to provide a reaction site to blocked polyisocyanates. Examples of hydroxyl or ketimine group-containing amines include diethanolamine, N-methylethanolamin and diethylenetriamine methyl isobutyl ketimine.

Cationic modified epoxy resins produced by the addition reaction of an epoxy resin and an amine are known in the art. Typical examples of starting epoxy resins are diglycidyl ether type epoxy resins produced by reacting epichlorohydrine with a polycyclic polyphenol such as bisphenol A, bisphenol F, bisphenol S and the like. Prior to the reaction with amines, the epoxy resin may be modified by reaction with a monohydroxyl compound such as monoalkanols, alkylphenols or glycol monoethers, to open part of the epoxy rings or it may be chain-extended by the reaction with a dihydroxyl compound such as bisphenols, glycols or polycaprolactone diols. The term "epoxy resin having a plurality of epoxy groups in the molecule" as used herein includes not only epoxy resins produced by reacting polycyclic polyphenols with epichlorohydrin but also these modified or chain-extended products. The addition reaction with amines may be performed using the same type amines used for ring-opening the monoepoxide compound. If desired, the epoxy resin for binder resins may be mixed with the monoepoxide compound before subjecting both components to the addition reaction with amines simultaneously.

The cathodic electrodeposition paint of the present invention may be prepared by emulsifying the binder resin, 1-10 weight parts per 100 weight parts of the binder resin of the monoepoxide-amine adduct, and a blocked polyisocyanate crosslinker in an aqueous medium containing a neutralizing agent. The neutralizing agent is an inorganic or organic acid such as hydrochloric, nitric, phosphoric, formic, acetic or lactic acid. The quantity thereof should be sufficient to achieve at least 20 %, perferably 30–60 % neutralization of amino groups present in the paint.

The amount of blocked polyisocyanate crosslinker should be sufficient to give a cured film having satisfactory performance and generally ranges between 5 and 50 % by weight of the resin content as solids.

The paint formulation may contain an unblocking catalyst for the blocked polyisocyanate in an amount of 0.1–5 % by weight of the blocked polyisocyanate. Typically the catalyst is a tin compound such as dibutyltin dilaurate or stannous acetate.

The paint formulation may contain coloring pigments such as titanium dioxide, carbon black or red iron oxide; rust proofing pigments such as basic lead silicate or aluminum phosphomolybdate; extender pigments such as kaolin, clay or talc; and other conventional additives such as water-miscible organic solvents, surfactants, antioxidants, UV absorbers and the like.

The following examples are intended to further illustrate the invention without limiting thereto. All parts and percents therein are by weight unless otherwise indicated.

PRODUCTION EXAMPLE 1

Chain Extention of Epoxy Resin

A flask equipped with a reflux condenser and a stirrer was charged with 476 parts of EPIKOTE 828 (bisphenol A epoxy resin sold by Yuka Shell Epoxy Company), 203 parts of bisphenol A and 40 parts of TONE 0200 (polycaprolactone diol sold by Union Carbide Corporation, M. W. about 543). The mixture was heated to 150° C. in a nitrogen gas atmosphere. To this were added 23 parts of dimethylbenzylamine portionwise twice and the mixture allowed to react until an epoxy equivalent of 1190 was reached. After cooling, 179 parts of xylene were added thereto to obtain a chain-extended epoxy resin having a nonvolatile content of 80 %.

PRODUCTION EXAMPLE 2

Blocked Polyisocyanate

A flask equipped with a reflux condenser, a stirrer and a drip funnel was charged with 291 parts of tolylenediisocyanate. To this were added dropwise 218 parts of 2-ethylhexanol with stirring in a nitrogen gas atmosphere while keeping the inner temperature below 38° C. After the addition, the reaction mixture was maintained at the same temperature for 30 minutes and then heated to 60° C. To this were added 75 parts of trimethylolpropane and 0.08 parts of dibutyltin dilaurate. The mixture was allowed to react at 120 ° C. with stirring until substantially all isocyanate functions disappeared IR spectrometrically. This reaction product was diluted with 249 parts of methyl isobutyl ketone to give a solution of blocked polyisocyanate having a nonvolatile content of 70 %.

PRODUCTION EXAMPLE 3

Amine-monoepoxide Adduct 711 parts of lauryl glycidyl ether placed in a flask equipped with a reflux condenser and a stirrer were heated to 110 ° C. To this were added 189 parts of N-methylethanolamine and the mixture was allowed to react at 120° C. for 1 hour.

EXAMPLE 1

A flask equipped with a reflux condenser and a stirrer was charged with 504 parts of chain-extended epoxy resin of Production Example 1 and 8.2 parts of lauryl glycidyl ether and heated to 110 ° C. To this were added 24.9 parts of N-methylethanolamine and 13.3 parts of diethylenetriaminemethyl isobutyl ketimine (73 % solution in MIBK). The mixture was allowed to react at 120 ° C. for 1 hour, cooled to room temperature and mixed with 347 parts of blocked polyisocyanate of Production Example 2. The resulting mixture was emulsified in 710 parts of deionized water containing 8.9 parts of acetic acid to give a stable emulsion having a nonvolatile content of 30 %. The particle size was 120 nm.

EXAMPLE 2

Example 1 was repeated except that 12.3 parts of nonylphenyl glycidyl ether were replaced for 8.2 parts of lauryl glycidyl ether. A stable emulsion having a nonvolatile content of 30 % and a particle size of 110 nm was obtained.

EXAMPLE 3

Example 1 was repeated except that 8.2 parts of polyoxypropylene monobutyl monoglycidyl ether having a molecular weight of 420 were replaced for 8.2 parts of lauryl glycidyl ether. A stable emulsion having a nonvolatile content of 30 % and a particle size of 150 nm was obtained.

EXAMPLE 4

A flask equipped with a reflux condenser and a stirrer was charged with 507 parts of chain-extended epoxy resin of Production Example 1 and heated to 110° C. To this were added 23 parts of N-methylethanolamine and 12.2 parts of diethylenetriamine methyl isobutyl ketimine (73 % solution in MIBK) and allowed to react at 120 ° C. for 1 hour. The resulting adduct was mixed with 11.3 parts of aminemonoepoxide adduct of Production Example 3 and 347 parts of blocked polyisocyanate of Production Example 2, and then emulsified in 710 parts of deionized water containing 8.9 parts of acetic acid. A stable emulsion having a nonvolatile content of 30 % and a particle size of 130 nm was obtained.

EXAMPLE 5

Example 4 was repeated except the amount of aminemonoepoxide adduct of Production Example 3 and acetic acid were increased to 33.9 parts and 10.4 parts, respectively. A stable emulsion having a nonvolatile content of 30 % and a particle size of 140 nm was obtained.

COMPARATIVE EXAMPLE 1

Example 1 was repeated except that 5.3 parts of 2-ethylhexyl glycidyl ether were replaced for 8.2 parts of lauryl glycidyl ether. An emulsion having a nonvolatile content of 30 % and a particle size of 800 nm was obtained. This emulsion was unstable and thus sedimentation of particles into a mass was observed within 24 hours.

COMPARATIVE EXAMPLE 2

Example 4 was repeated except that 7.2 parts of N-methylethanolamine were replaced for 11.3 parts of aminemonoepoxide adduct of Production Example 3. This emulsion was unstable and thus sedimentation of particles into a mass was observed within 24 hours.

Electrodeposition Coating

The emulsions of Examples 1-5 were each diluted to a nonvolatile content of 20 % with deionized water and applied electrically on a zinc phosphate-treated steel plate to a dry film thickness of about 20 microns. The film was rinsed with water and baked at 200° C. for 20 minutes to give a smooth film having satisfactory performance.

What is claimed is:

1. A non-pigmented stable fine particle emulsion useful when a pigment is added thereto for producing a pigmented cathodic electrodeposition paint, comprising:
- (a) particles in the 110–150 μm size range of a cationic modified epoxy binder resin produced by the addition reaction of an epoxy resin having a plurality of epoxy groups in the molecule and a primary or secondary amine;
- (b) 0.1 to 10 weight parts per 100 parts of said modified epoxy resin of an adduct of a monoepoxide compound having a hydrophobic group or block sufficiently hydrophobic to allow said adduct to emulsify said binder into said particles and a primary or secondary amine; and
- (c) a blocked polyisocyanate compound; said compounds (a), (b) and (c) being emulsified in an aqueous medium containing a neutralizing agent.

2. The emulsion according to claim 1, wherein said epoxy resin is chain-extended and the epoxy groups of the chain-extended epoxy resin are closed and intact, wherein said monoepoxide compound contains at least 13 carbon atoms, has a molecular weight from 200 to 1,000 and is a glycidyl ether of a fatty alcohol containing at least 10 carbon atoms; wherein said primary or secondary amine additionally has a hydroxyl group; wherein the proportion of said blocked polyisocyanate compound is 5 to 50% by weight of the sum of said components (a), (b) and (c) on solid basis; and wherein the proportion of said neutralization agent is sufficient to achieve at least 20% neutralization of said components (a) and (b).

3. A method for preparing a stable emulsion suitable for the production of pigmented cathodic electrodeposition paint comprising the step of dispersing, in the absence of paint pigment, a mixture of
- (a) particles in the 110–150 um size range of a cationic modified epoxy binder resin produced by the addition reaction of an epoxy resin having a plurality of epoxy groups in the molecule and a primary or secondary amine;
- (b) 0.1 to 10 weight parts per 100 parts of said modified epoxy resin of an adduct of a monoepoxide compound having a hydrophobic group or block sufficiently hydrophobic to allow said adduct to emulsify said binder into said particles, and a primary or secondary amine; and
- (c) a blocked polyisocyanate compound; to form a stable emulsion.

4. The method of claim 3, wherein said monoepoxide-amine adduct is produced in situ by reacting said primary or secondary amine with a mixture of said epoxy resin and said monoepoxide compound.

5. A method of claim 4, wherein said monoepoxide compound is a glycidyl ether of a fatty alcohol containing at least 10 carbon atoms.

6. A method of claim 4, wherein said monoepoxide compound is a glycidyl ether of an alkylphenol having at least 4 carbon atoms in the alkyl moiety.

7. The method of claim 4, wherein said monoepoxide compound is a polyoxypropylene monoalkyl monoglycidyl ether.

8. The method of claim 1, wherein said monoepoxide compound contains at least 13 carbon atoms and has a molecular weight from 200 to 1,000.

9. The method of claim 1, wherein said monoepoxide compound is a glycidyl ether of a fatty alcohol containing at least 10 carbon atoms.

10. The method of claim 1, wherein said monoepoxide compound is a glycidyl ether of an alkylphenol having at least 4 carbon atoms in the alkyl moiety.

11. The method of claim 1, wherein said monoepoxide compound is a polyoxypropylene monoalkyl monoglycidyl ether.

12. The method of claim 1, wherein said primary or secondary amine additionally has a hydroxyl group.

13. The method of claim 1, wherein said primary or secondary amine additionally has a ketiminized primary amino group.

14. The method of claim 1, wherein the proportion of said blocked polyisocyanate compound is 5 to 50 % by weight of the sum of said components (a), (b) and (c) on solid basis.

15. The method of claim 1, wherein said neutralization agent is an inorganic or organic acid.

16. The method of claim 15, wherein the proportion of said acid is sufficient to achieve at least 20% neutralization of said components (a) and (b).

17. The method of claim 16, wherein said proportion is sufficient to achieve 30 to 60 % neutralization of said components (a) and (b).

* * * * *

UNITED STATES PATENT AND TRADEMARK OFFICE
CERTIFICATE OF CORRECTION

PATENT NO. : 5,418,263
DATED : May 23, 1995
INVENTOR(S) : Toshiaki SAKAMOTO et al.

It is certified that error appears in the above-indentified patent and that said Letters Patent is hereby corrected as shown below:

Claim 1; column 5, line 3: Reads "$\mu m$" should read: -- nm --.

Claim 3; column 5, line 35: Reads "$\mu m$" should read: -- nm --.

Signed and Sealed this

Twenty-fifth Day of February, 1997

Attest:

BRUCE LEHMAN

*Attesting Officer*  *Commissioner of Patents and Trademarks*